United States Patent [19]
Weckesser

[11] 3,909,884
[45] Oct. 7, 1975

[54] WEDGE LOCK CABLE CLAMP
[75] Inventor: Ethan Weckesser, Chicago, Ill.
[73] Assignee: Weckesser Company, Inc., Chicago, Ill.
[22] Filed: Feb. 10, 1975
[21] Appl. No.: 548,535

[52] U.S. Cl. ......... 24/73 SA; 248/74 PB; 24/73 PB; 24/16 PB
[51] Int. Cl.² ........................... A44B 21/00
[58] Field of Search... 248/74 PB; 24/16 PB, 73 SA, 24/73 PB, 73 PF, 230 B, 73 AP, 17 AP, 206 A, 208 A, 305 P, 230 F, 230 CF, 230 SL

[56] References Cited
UNITED STATES PATENTS

| | | | |
|---|---|---|---|
| 3,149,808 | 9/1964 | Weckesser | 248/74 PB |
| 3,224,056 | 12/1965 | Joffe | 24/16 PB |
| 3,653,099 | 4/1972 | Hoffman | 24/16 PB |

*Primary Examiner*—Geo. V. Larkin
*Attorney, Agent, or Firm*—Edward C. Threedy

[57] ABSTRACT

A clamping device for securing or binding a plurality of wires or cables together comprising a binding strap having both faces formed to provide interlocking ratchet teeth and a receptacle having an internal passage tapered throughout its internal length into which the opposite ends of the strap are projected, and a wedge type locking member insertable into the passage and into binding engagement with the strap to secure the same within the receptacle.

6 Claims, 4 Drawing Figures

U.S. Patent    Oct. 7,1975    3,909,884

WEDGE LOCK CABLE CLAMP

SUMMARY OF THE INVENTION

A cable clamp and binding strap by which a plurality of wires, cables, rods or the like may be bound together, the binding strap being made from synthetic material and providing opposite faces formed with interlocking or ratchet teeth extending transversely with respect to the length of the strap. The clamp consists of a rectangularly shaped lock housing having an internal passage therethrough tapered in the direction of its length, so that one of the internal walls defining the passage adjacent the narrow end thereof provides a toothed formation adapted to engage and lock one face of one end of the strap within the housing. A wedge lock generally triangular in shape is provided for insertion into the lock housing to one side of the interlocking ends of the strap and through the narrow end of the lock housing. Such wedge lock provides a stop shoulder at its apex or insertable end, which is adapted to momentarily cam a locking flap provided by the top wall of the locking housing out of its normal plane as the wedge lock is inserted into the housing and into locking engagement with the strap.

GENERAL DESCRIPTION

This invention is an improvement over the wedge type clamp shown in U.S. Pat. No. 3,149,808 issued Sept. 22, 1964 to the assignee hereof.

The invention will be best understood by reference to the accompanying drawings showing the preferred form of construction, and in which.

Figure 1:
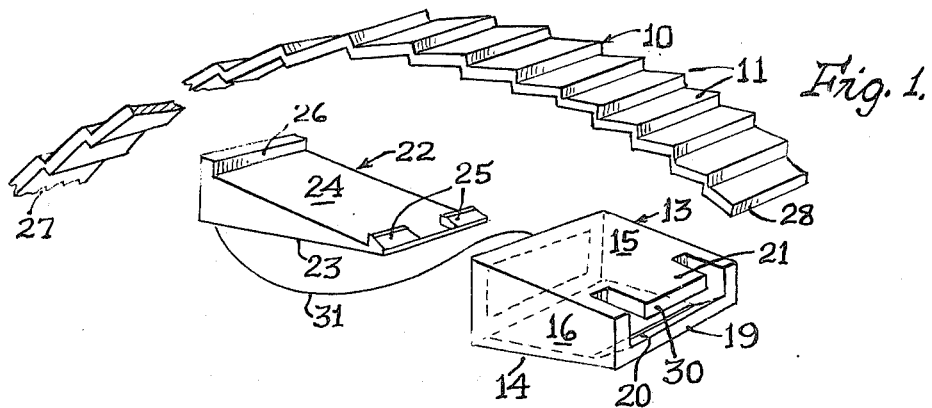
FIG. 1 is a perspective view of the clamping strap, the lock housing, and the wedge clamp.

Referring to FIG. 1, there is shown an elongated strap 10 preferably molded from a synthetic plastic material which is semi-pliable. Each face or flat surface of the strap provides ratchet teeth 11 and 12 which extend transversely to the elongated length of the strap 10.

The wedge clamp includes a lock housing 13 which is substantially prismoidal in configuration, such that it provides a bottom wall 14, a tapered top wall 15, and opposite side walls 16 and 17 which are spaced apart a distance equal to the width of the strap 10 so that the same may be projected therebetween. The lock housing 13 is hollow and provides a tapered passage 18 therethrough. The bottom wall 14 adjacent the narrow end 19 provides a toothed abutment 20 which extends upwardly into the passage 18 so as to intersect the same as it exits out of the narrow end 19 of the hollow housing 13.

The top wall 15 of the lock housing 13 provides a free-standing locking tab 21 which is formed by being of a width less than the distance between the side walls 16 and 17, such that it is separated therefrom at the narrow end 19 of the housing 13, as shown in FIG. 1.

A wedge clamp 22 is provided, which is generally triangular in cross section. As such, the wedge clamp 22 provides a substantially flat base 23 and a hypotenusal side 24. The hypotenusal side 24 terminates at its junction with the base 23 into two generally triangularly shaped wall abutments 25 which have a vertical height less than the altitude of the triangular wedge clamp 22. The opposite end of the hypotenusal side 24 terminates into a rectangularly shaped wall abutment 26.

Figure 2:
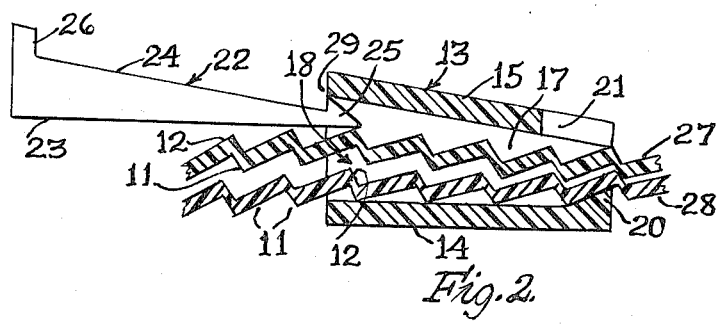
FIG. 2 is a fragmentary detailed sectional view showing the interrelation of the parts of the invention one to another prior to their clamped condition.

In use, the opposite ends 27 and 28 of the strap 10, after the same has encircled the wires, cables, or rods which are to be bound together, are inserted through the lock housing 13 in opposite directions, with their ratchet teeth 11 and 12 in confronting position with respect to each other. As shown in FIG. 2, the innermost end 28 of the now formed loop of the strap 10 will have one of its ratchet teeth 11 in facial contact with the tooth abutment 20 provided by the bottom wall 14 of the lock housing 13.

Figure 3:
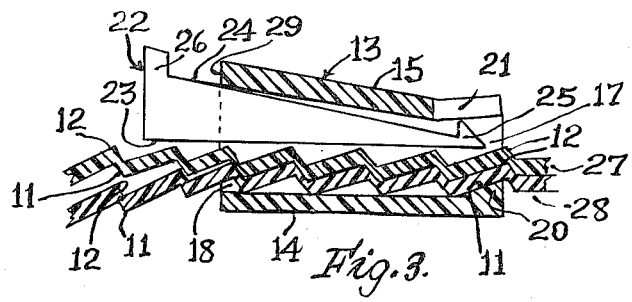
FIG. 3 is a fragmentary detailed sectional view similar to FIG. 2, showing the parts in a further associated relation.
Figure 4:
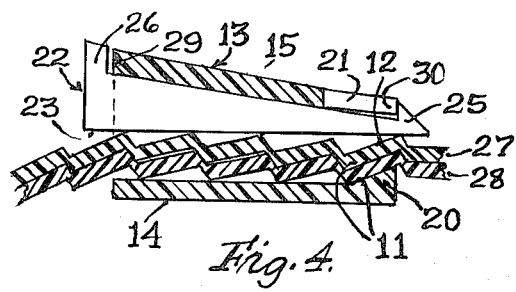
FIG. 4 is a fragmentary detailed sectional view showing the device in its clamped condition.

The wedge clamp 23 is then inserted into the tapered passage 18 formed in the lock housing 13, with the base side 23 thereof passing over the ratchet teeth 12 of the outer end 27 of the strap 10, as shown in FIG. 2. As the wedge clamp is moved into the passage 18, the triangular abutments 25 formed at the narrow end thereof will cam the locking tab 21 out of its normal plane and away from the toothed abutment 20 as well as the mating faces of the strap 10, as shown in FIG. 3.

As the wedge clamp 23 is further projected into the passage 18, the wall abutment 26 will engage the forward top edge 29 of the top wall 15 so as to restrict further inward movement of the wedge clamp 23 into the passage 18. At this time, however, the wall abutments 25 will have passed beyond the outer edge 30 of the locking tab 21, permitting it to return to its normal plane, wherein the relation between the locking tab 21, the wedge clamp 23, and the toothed projection 20 will bind the mating ratchet teeth 11 and 12 of the opposite ends 27 and 28 of the strap 10 into a locked condition. In such locked condition the strap 10 cannot be removed from about the items bound together by it, nor can the wedge clamp 23 be removed from its locking relation with respect to the strap 10.

As shown in FIG. 1, the lock housing 13 and the wedge clamp 23 may be joined together by a thin flexible web 31 which, while connecting the same together so that before assembly they will not be accidentally separated, will not interfere with the locking operation of these parts as described hereinbefore.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A clamp for securing together a bundle of wires and the like comprising in combination
   a. an elongated binding strap having each of its flat faces provided with interlocking ratchet teeth extending transversely to the length of the strap,
   b. a housing providing a passage extending therethrough into which opposite ends of said strap are projected, with their ratchet teeth in mating relation as said strap is looped about a bundle to be secured thereby, c. catch means within said housing and partially interrupting the passage formed therethrough and engaging certain of the ratchet teeth of said strap when the latter is projected through said housing, d. latch means insertable into said housing and upon said strap to lock said ratchet teeth of each opposite end of said strap together and upon said catch means within said passage, and e. yieldable means provided by one wall of said housing above said catch means and cooperating therewith to restrict a portion of the passage formed through said housing to a height less than that of the strap ends and said latch means, and movable away from said catch means by said latch means when the latter is inserted into said housing upon said strap to lock said strap within said passage.

2. A clamp for securing together a bundle of wires and the like as defined by claim 1, including means on either end of said latch means preventing removal in either direction of said latch means from said housing when said latch means has been inserted in said passage so as to bind said ratchet teeth of said strap into mating relation and upon said catch means.

3. A clamp for securing together a bundle of wires and the like as defined by claim 1, wherein said latch means comprises a substantially triangularly shaped wedge, the base of which is adapted to be projected upon the mating ends of said strap to bind the same upon said catch means.

4. A clamp for securing together a bundle of wires and the like as defined by claim 3, including means on either end of said wedge preventing removal in either direction of said wedge from said housing when said wedge has been inserted in said passage so as to bind said ratchet teeth of said strap into mating relation and upon said catch means.

5. A clamp for securing together a bundle of wires and the like as defined by claim 1, wherein said yeildable means comprises a free-standing tab provided by one wall of said housing and extending in the direction of said passage and above said catch means and in the path of said latch means when the latter is inserted into said passage, with said tab biased away from said catch means by said latch means during its insertion and cooperating therewith to lock said strap upon said catch means.

6. A clamp for securing together a bundle of wires and the like as defined by claim 5, including means on either end of said latch means preventing removal in either direction of said latch means from said housing when said latch means has been inserted in said passage so as to bind said ratchet teeth of said strap into mating relation and upon said catch means.

* * * * *